United States Patent

[11] 3,617,753

[72] Inventors Taketoshi Kato
Yokohama-shi;
Shigeharu Horiuchi, Yokohama-shi; Shigeo Tsuji, Fujisawa-shi, all of Japan

[21] Appl. No. 2,171
[22] Filed Jan. 12, 1970
[45] Patented Nov. 2, 1971
[73] Assignee Tokyo Shibaura Electric Co., Ltd.
Kawasaki-shi, Japan
[32] Priorities Jan. 13, 1969
[33] Japan
[31] 44/2788;
Mar. 3, 1969, Japan, No. 44/15406

[54] SEMICONDUCTOR PHOTOELECTRIC CONVERTING DEVICE
10 Claims, 9 Drawing Figs.

[52] U.S. Cl. .......... 250/211 J, 313/94, 317/235 N
[51] Int. Cl. .......... H01j 39/12
[50] Field of Search .......... 250/211 J; 317/235 N, 234; 313/65, 166, 94; 178/7.86, 7.6, 7.7

[56] References Cited
UNITED STATES PATENTS

| | | | |
|---|---|---|---|
| 3,278,814 | 10/1966 | Rutz | 317/235 |
| 3,322,955 | 5/1967 | Desvignes | 250/211 |
| 3,328,584 | 6/1967 | Weinstein | 317/235 |
| 3,440,477 | 4/1969 | Crowell et al. | 307/235 |
| 3,458,782 | 6/1969 | Buck et al. | 3.3/235 |

*Primary Examiner*—James W. Lawrence
*Assistant Examiner*—D. C. Nelms
*Attorney*—Kemon, Palmer & Estabrook

ABSTRACT: A semiconductor photoelectric converting device comprising a semiconductor substrate having a plurality of PN-junctions separately formed therein in three groups according to their different depths so as to allow the red, green and blue components of a light from a foreground object to be separated by said groups respectively.

INVENTOR.
Taketoshi Kato
Shigeharu Horiuchi
Shigo Tsuji
BY
Kenyon, Palmer & Estabrook
Attys.

INVENTOR.
Taketoshi Kato
Shigeharu Horiuchi
BY Shigeo Tsuji
Kemon, Palmer + Estabrook
attys.

SEMICONDUCTOR PHOTOELECTRIC CONVERTING DEVICE

BACKGROUND OF THE INVENTION

The present invention relates to a semiconductor photoelectric-converting device, and particularly to the ones adapted for use in color television.

For simplification and miniaturization of a color television system, there are known various methods using a single image pickup tube so as to split a light from a foreground object into a plurality 20, 22 Most common among these methods is the device which will be described later. This device comprises an ordinary image pickup tube including, for example, a diode array semiconductor target, a group of three relays lenses disposed ahead of said pickup tube and, red, green and blue filters positioned in front of said lenses respectively. Accordingly, a light from a foreground object is split into red, green and blue components by these filters. These color components are conducted through said relay lenses to the image pickup tube where said color components are subjected to photoelectric conversion. With the aforesaid prior art photoelectric converting system or device, it is difficult to obtain a filter capable of distinctly splitting light, and moreover there is required advanced PN junctions in properly locating such a filter.

SUMMARY OF THE INVENTION

The present invention has improved the target or photoelectric converting device of an image pickup tube used in color television and completely eliminated the necessity of using color filters as in the case with the prior art system.

The photoelectric converting device according to the present invention comprises a semiconductor substrate having a surface for receiving a light from a foreground object, a plurality of PN junctions separately formed in said substrate and divided into three groups in accordance with the different distances between said junctions and substrate surface, said groups of PN junctions being actuated in response to the red, green and blue components of said light respectively so as to convert it into electrical color signals.

DETAILED DESCRIPTION OF THE INVENTION

Figures 1, 3, 5:
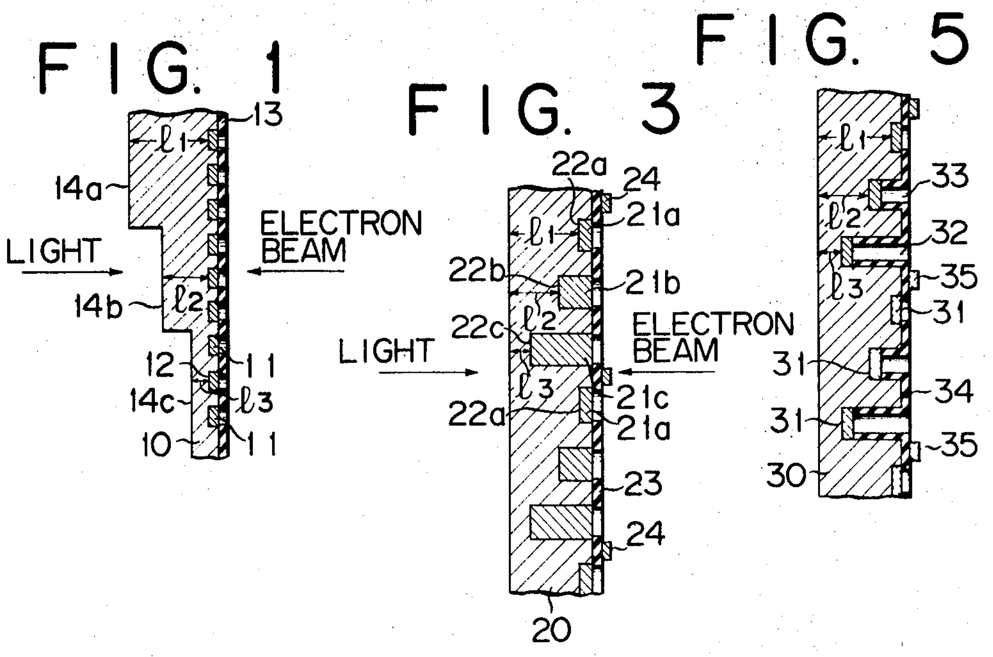
FIG. 1 is a cross-sectional view of a semiconductor photoelectric converting device according to an embodiment of the present invention.
FIG. 3 is a cross-sectional view on line 3—3 of the device shown in FIG. 2.
FIG. 5 is a cross-sectional view on line 5—5 of the device shown in FIG. 4.

There will now be described by reference to FIG. 1 a semiconductor photoelectric-converting device according to an embodiment of the present invention. Numeral 10 denotes an N-type silicon substrate having a prescribed thickness and specific resistance of 10 Ω-cm. In that flat plane of said substrate 10 which is scanned by electron beams when the semiconductor device is incorporated into a vidicon, there are formed by selective diffusion a plurality of separate P-type regions 11 to define PN junctions 12 with said substrate 10. These regions 11 are formed with a prescribed depth, for example of 2 microns. On the surface of said substrate 10 except for those parts where there are formed said P-type regions 11, there is deposited a protective film 13 made of, for example silicon dioxide or monoxide in a manner to cover those parts of said PN junctions 12 which are exposed to said surface. The opposite plane of said substrate 10 for receiving a light from a foreground object is formed by etching into three steplike parts, namely, consists of a first plane **14*a*, second plane 14*b* and third plane 14*c*. The distance $l_1$, $l_2$ and $l_3$ between the surfaces of said three planes and the bottom planes of said PN junctions 12 are so chosen as to be 20, 8 and 2 microns respectively. For convenience, an aggregate of PN junctions corresponding to the first projection 14*a* spaced 20 microns therefrom is designated as a first group and an area covered by said group as a first region. Similarly, an aggregate of PN junctions facing the second projection 14*b* spaced 8 microns therefrom is denoted as a second group and an area covered by said second group as a second region, and a series of PN junctions associated with the third 2-micron spaced plane 14*c*** as a third group and an area represented by said third group as a third region.

In a semiconductor photoelectric-converting device constructed as described above, a visible light introduced through said steplike plane of the substrate 10 has its components whose wavelength is about *800* microns, that is, the red component, absorbed in said first region. As a result, the PN junctions of the first group are only stored with signals of the red component. On the other hand, the PN junctions of the second and third groups are supplied with green and blue signals respectively since the other components are absorbed or transmitted in the semiconductor substrate. That plane of the semiconductor photoelectric converting device where the respective components of light are stored in the corresponding PN junctions is coated with a film of silicon dioxide as described above. When said plane is scanned laterally by electron beams then there can be taken out line-sequentially the respective color image signals, while when scanned longitudinally thereby the respective color image signals are obtained field-sequentially.

As mentioned above, the semiconductor photoelectric converting device of the present invention is capable of not only converting a foreground object into electrical signals just like the similar target of the prior art device, but also splitting said light into three primary colors, so that a color television system using this photoelectric device need not be provided with any color filter at all.

Figures 2, 4:
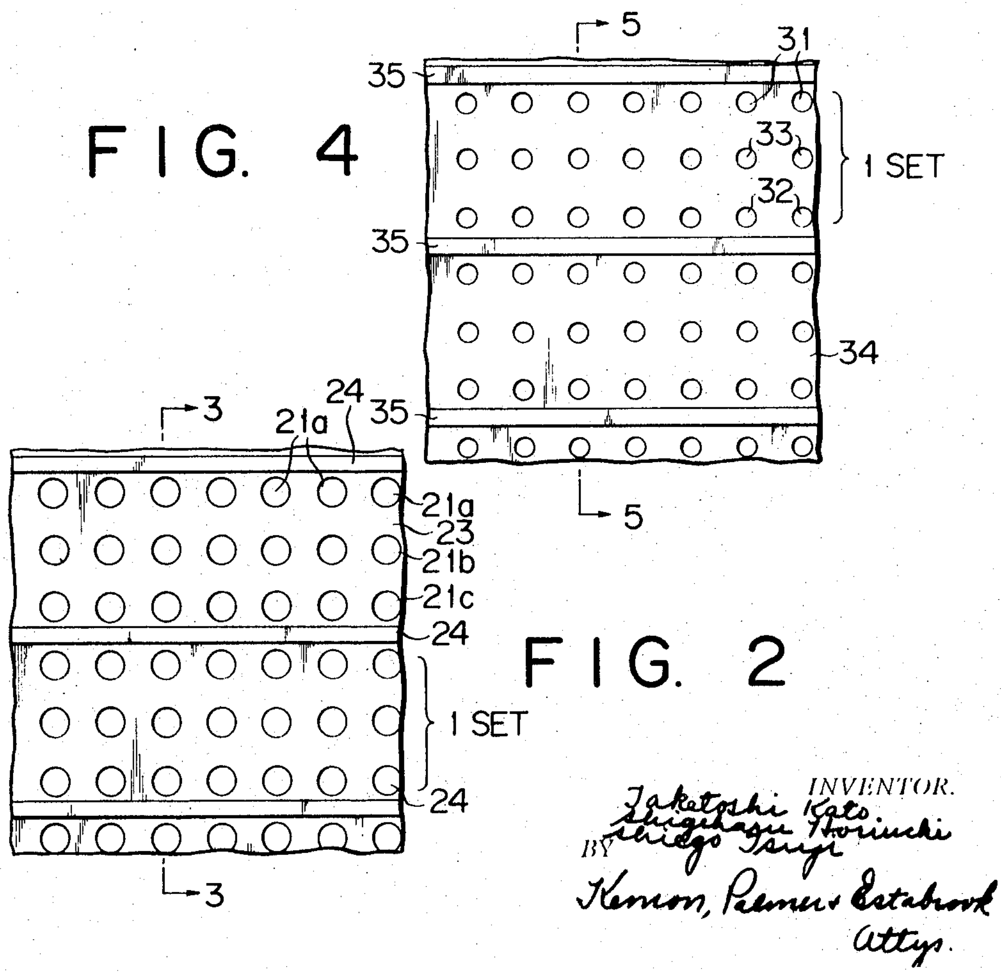
FIG. 2 is a plan view of a semiconductor device according to another embodiment.
FIG. 4 is a plan view of a semiconductor device according to still another embodiment.

The semiconductor photoelectric converting device of the present invention is not limited to the aforementioned type, but may be arranged, for example, as described below. As shown in FIGS. 2 and 3, there is provided an N-type silicon substrate 20, 22 microns thick whose specific resistance is 10 Ω-cm. On one side of said substrate 20 are formed three groups **21*a*, 21*b* and 21*c* of P-type regions which are diffused to depths of 2, 8 and 20 microns respectively, so as to define PN junctions 22*a*, 22*b* and 22*c* with said substrate 20. Accordingly, the distances $l_1$, $l_2$, and $l_3$ defined by the plane of the substrate 20 for receiving a light from a foreground object with the bottom planes of said three groups 22*a*, 22*b* and 22*c* of PN junctions are so chosen as to be 20, 8 and 2 microns respectively. The three groups 22*a*, 22*b* and 22*c* of PN junctions having different depths as described above are arranged in the substrate 20 in such a manner that PN junctions having the same depth are not juxtaposed in the longitudinal direction, that is, in the direction in which said substrate 20 is scanned by electron beams. Namely, there are disposed in the longitudinal direction three groups 22*a*, 22*b* and 22*c* of PN junctions in the order mentioned with distances of 2, 8 and 20 microns allowed between said substrate surface and the bottoms of respective groups of PN junctions. In the lateral direction of the substrate 20 there are arranged PN junctions having the same depth adjacent to each other in the same row. For convenience, these PN junctions are separated into three groups according to their to their different depths. The first of said groups is taken to represent an aggregate of PN junctions where $l_1$ measures 20 microns, the second of said groups as an aggregate where PN junctions $l_2$ is 8 microns and the third as a mass where $l_3$ is 2 microns. Further, three PN junctions having different depths and disposed adjacent to each other in the longitudinal direction of the substrate are collectively designated as one set of PN junctions. The aforementioned P-type regions are 30 microns in diameter and spaced from each other at a pitch of 40 microns. On that side of the substrate 20 in which there are prepared P-type regions in the aforementioned form and arrangement, there is further coated a protective film 23 made of insulating material, for example, silicon dioxide, except on those parts of the substrate where there are positioned said P-type regions. On said protective film between the PN junction 22*c* of one set and the PN junction 22*a* of the succeeding set in the longitudinal direction there is formed an index electrode 24. This index electrode 24 is shaped, as shown in FIG. 2**, like a continuous narrow strip extending in the lateral direction of the substrate. Electron beams scan the substrate surface in its longitudinal direction.

When incorporated in an image pickup tube, the semiconductor photoelectric converting device according to the embodiment of FIGS. 2 and 3 can, as in the preceding embodiment, generate color image signals corresponding to a light from a foreground object. When scanned by electron beams, said index electrodes 24 produce index signals which are used in sampling of color signals.

In the embodiment of FIGS. 2 and 3, the distances $l_1$, $l_2$ and $l_3$ between the three groups of PN junctions and that side of the substrate into which there is introduced a light from a foreground object are determined by controlling the depth to which each P-type region is formed. But instead, there may be formed, as shown in FIGS. 4 and 5, cavities in the substrate surface. There will now be concretely described the embodiment of FIGS. 4 and 5. The substrate 30 is so formed as to have opposite parallel flat planes and a thickness of 22 microns with $l_3$ set at 2 microns, and then it is only required to form, for example, a P-type region 31 to a depth of 2 microns and dig out a first cavity 32 to a depth of 18 microns. Also where $l_2$ is to stand at 8 microns, then, said P-type region 31 may be formed 2 microns deep and a second cavity 33 may be so formed as to be 10 microns deep. Thus where said P-type region is 2 microns deep, then $l_1$ will naturally amount to 20 microns. With respect to the embodiment of FIGS. 4 and 5, separation of PN junctions into groups and sets, coating of a silicon dioxide film 34 except that the inner surfaces of cavities are covered therewith and formation of index electrodes 35 may be conducted in the same manner as in the preceding embodiment of FIGS. 2 and 3, and description thereof is omitted.

The concept of the present invention is applicable not only to a target involved in an image pickup tube scanned by electron beams, but also to a target provided with the so-called solid state circuit.

Figure 6:
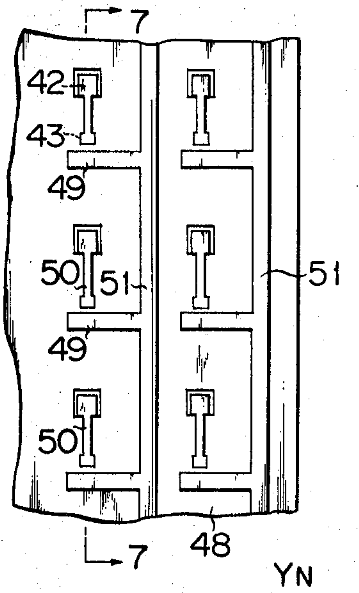
FIG. 6 is a plan view of part of a semiconductor device according to a further embodiment.
Figure 7:
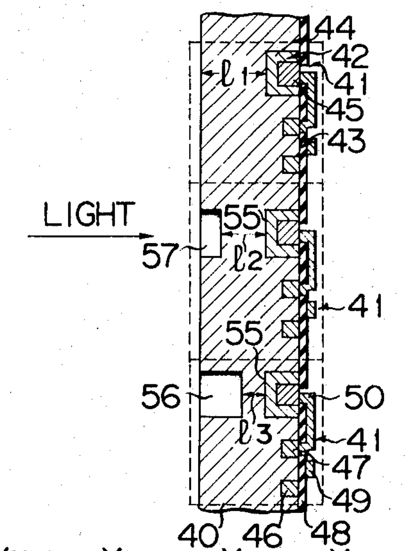
FIG. 7 is a cross-sectional view on line 7—7 of the device shown in FIG. 6.
Figures 8, 9:
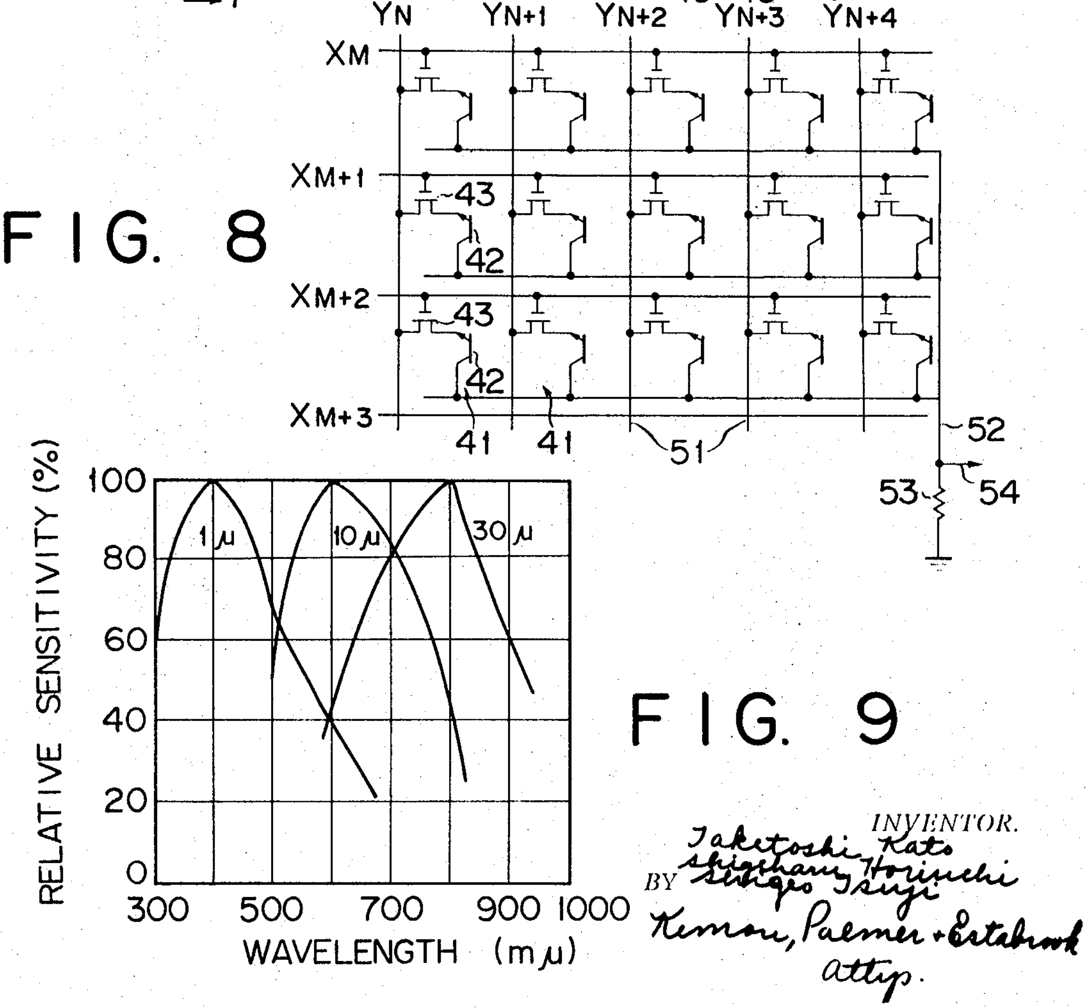
FIG. 8 represents an equivalent circuit associated with the device shown in FIGS. 6 and 7.
FIG. 9 is a diagram showing the relationship of the wavelengths of a light introduced from a foreground object into the semiconductor photoelectric converting device of the present invention and the relative outputs therefrom.

There will now be described said solid state circuit target by reference to FIGS. 6 to 8. One side of an N-type silicon substrate 40 is divided into a plurality of blocks 41. In each block there are formed a planar transistor element 42 and an MOS-type transistor element 43. Said planar transistor element 42 consists of a collector region constituted by said substrate, a base region 44 of P formed in said collector region and an emitter region 45 of N formed in said base region 44. Said MOS-type transistor element 43 comprises drain and source regions 46, 47 of P formed in the substrate 40 at a prescribed space from each other, and gate electrodes 49 mounted on a silicon dioxide film 48 formed in that part of the substrate defined between said drain and source regions 46, 47. The emitter region 45 of said planar transistor element 42 and the source region 47 of the MOS-type transistor element 43 are mutually short circuited by an electrode 50. The gate electrodes 49 of the MOS-type transistor elements 43 of the blocks juxtaposed in the lateral direction of the substrate are connected to each other by a common electrode 51. On the other hand, the drain regions of the MOS-type transistor elements 43 of the blocks juxtaposed in the longitudinal direction of the substrate are connected to each other. Of course, the planar transistor elements 42 have a common collector region. A lead wire 52 drawn from said common collector is grounded through a resistor 53 (FIG. 8). Between the resistor 53 and substrate is connected the output terminal 54 of said lead wire 52. On the side of the substrate for receiving a light from a foreground object there are formed first and second cavities 56 and 57 with different depths in such a manner that the distances $l_1$, $l_2$ and $l_3$ between the PN junctions 55 formed across the base and collector regions of said planar transistor element 42 and said light-receiving side of the substrate are set at 20, 8 and 2 microns respectively.

A solid state circuit having the aforementioned arrangement may be exemplified by an equivalent circuit shown in FIG. 8. The horizontal sides of the blocks form rows ($X_M$, $X_{M+1}$........) and the vertical sides thereof form columns ($Y_N$, $Y_{........)}$. 1.......). ........) To said rows X and columns Y are connected shift resistors. When the semiconductor photoelectric device according to the embodiment of FIG. 8 carries out a switching operation, then there are given forth from the output terminal color signals corresponding to the light from a foreground object.

As mentioned above, the present invention consists in forming a large number of PN junctions in a semiconductor substrate and allowing suitable distances between said PN junctions and the light-receiving plane of said substrate, thereby producing output color signals. Though the distances between the PN junctions and the light-receiving plane of the substrate are affected, for example, by the material of said substrate, and must be exactly determined, it is found that where there is used a silicon substrate as in the foregoing embodiments, the proper distances for obtaining red, green and blue components are preferably about 1 to 2 microns, about 8 microns and about 20 microns respectively. The relationship between the light components and the relative sensitivity of the semiconductor photoelectric converting device of the present invention was determined with the distances between the PN junctions and the light-receiving plane of the substrate, the results being represented in FIG. 9. In this figure, the abscissa represents the wavelength (millimicrons) of output light components and the ordinate denotes the relative sensitivity (percent) of the semiconductor photoelectric converting device.

As described in connection with the last mentioned embodiment, the semiconductor photoelectric converting device of the present invention does not always have to be scanned by electrons. Nor the material of the semiconductor substrate used in said device is limited to silicon, but it may consist of other semiconductor materials, for example, germanium, or gallium arsenide. Further, said substrate may assume not only N-type but also P-type material. It will be apparent, however, that in the latter case, a plurality of regions should be of N-type conductivity.

What is claimed is:

1. A semiconductor photoelectric-converting device comprising a semiconductor substrate having a light-receiving surface, and a plurality of separate PN junctions juxtaposed in said substrate, the junctions being divided into three groups in accordance with three different distances as measured between said junctions and said surface to store information corresponding to the red, green and blue components respectively of light received from a foreground object upon said surface.

2. A semiconductor photoelectric converting device comprising a semiconductor substrate of one conductivity type, said substrate having a three-steplike light-receiving surface formed on the one side thereof and a flat scanning surface formed on the opposite side, and a plurality of separate, juxtaposed regions of the opposite conductivity type from said substrate, said regions extending from the flat surface into the substrate to the same depth to define PN junctions corresponding in number to the number of said regions divided into three groups in accordance with the different distances between said junctions and said steplike surface of the substrate, the three groups of the PN junctions storing information corresponding to the red, green and blue components respectively of light received from a foreground object upon said surface.

3. The device according to claim 2 which further includes a silicon oxide film deposited on said flat scanning surface of the substrate except on those parts of the substrate where there are formed said regions.

4. A semiconductor photoelectric converting device comprising a semiconductor substrate of one conductivity type, said substrate having a light-receiving surface and a scanning surface which are parallel to each other, a plurality of separate regions of the opposite conductivity type from said substrate juxtaposed in said substrate, said regions being divided into three groups in accordance with their different depths from said scanning surface and PN junctions formed between said regions and substrate, said PN junctions corresponding to said three groups of regions storing information corresponding to the red, green and blue components respectively of light received from a foreground object upon said light-receiving surface.

5. The device according to claim 4 which further includes a silicon oxide film formed on said scanning surface of the substrate except on those parts of the substrate where there are formed said regions.

6. The device according to claim 5 wherein three adjacent PN junctions that represent one of said groups constitute a set of junctions and there is provided an index electrode on said silicon oxide film between adjacent ones of such sets of junctions.

7. A semiconductor photoelectric-converting device comprising a semiconductor substrate of one conductivity type, said substrate having a light-receiving surface and a scanning surface which are parallel to each other, a first group of cavities of the same depth extending from said scanning surface into the substrate, a second group of cavities of the same depth different from the depth of said first group extending from said scanning surface into the substrate, and a plurality of regions greater in number than the combined number of said first and second cavities all having the same thickness and the opposite conductivity type from said substrate, said regions being formed in the bottoms of said cavities and in said scanning surface of the substrate to define PN junctions between said regions and said substrate, said plurality of PN junctions being divided into three groups in accordance with the different distances measured from said junctions to said light-receiving surface to store information corresponding to the red, green and blue components respectively of light received from a foreground object upon said light-receiving surface.

8. The device according to claim 7 which further includes a silicon oxide film formed on said scanning surface of the substrate and the inner surface of the cavities except on these parts of the substrate where there are formed said regions.

9. The device according to claim 8 wherein three adjacent PN junctions that represent one each of said three groups constitute a set of junctions and there is provided an index electrode on said silicon oxide film between adjacent ones of such sets of junctions.

10. A semiconductor photoelectric-converting device comprising a semiconductor substrate of one conducting type, said substrate having a light-receiving surface, a plurality of planar transistor elements in said substrate, each element having an emitter and base region, PN junctions defined between said base regions and said substrate, a plurality of MOS-type transistors having source, drain regions and gate electrodes, the gate regions and source regions being electrically connected to one another respectively and each of said emitter regions being electrically connected to one of said drain regions, said PN junctions being divided into three groups in accordance with the different distances measured from said junction to said light-receiving surface to store information corresponding to the red, green and blue components respectively of light received from a foreground object upon said light receiving surface.

* * * * *